Patented Oct. 6, 1936

2,056,280

UNITED STATES PATENT OFFICE 2,056,280

PROCESS OF PRODUCING POTENTIALLY REACTIVE PHENOLIC CONDENSATION PRODUCTS

Franz Kurath and Oscar A. Cherry, Chicago, Ill., assignors to Economy Fuse & Manufacturing Company, Chicago, Ill., a corporation of New York No Drawing. Application July 30, 1934, Serial No. 737,570

6 Claims. (Cl. 260—4)

This invention relates to phenolic condensation products of the type adapted to be hardened by the action of heat, and more particularly to phenolic condensation products peculiarly adapted for use admixed with fillers as compositions for hot molding operations, wherein objects are formed and hardened by the combined action of heat and pressure.

This invention relates further to a process for preparing potentially reactive phenolic products of the above-described type.

This application is a continuation at least in part of Serial No. 378,561, filed July 15, 1929, in the names of the same applicants, Franz Kurath and Oscar A. Cherry.

An object of the present invention is to provide an economical, rapid method for preparing such products.

Another object is to prepare a product suitable for use in hot molding operations, said product possessing to a marked degree properties which render it superior to other known products of a similar type.

Another object is to provide a method whereby cheap phenolic bodies now generally regarded as unsuitable for hot molding operations may be used.

It is well known that in order to prepare infusible and insoluble phenolic condensation products possessing a maximum degree of resistivity and strength, a basic condensing agent must be used at least in the final stages of the reaction. It is preferable to use the basic condensing agent in the initial stages as well.

Among the basic condensing agents heretofore proposed are fixed bases, such as caustic soda, caustic potash or slaked lime; volatile bases, such as ammonium hydroxide; and basic salts, such as sodium sulphite, sodium acetate, sodium borate and the like. Each class of basic condensing agent has its own specific effect in promoting the reaction between phenol and formaldehyde, and, furthermore, there are slight differences in the effects of the individual members of each group as above divided.

As above stated, it is well known that the use of basic condensing agents in contradistinction to acidic condensing agents results in a final infusible product possessing a high degree of chemical and mechanical resistance. It has been further pointed out by Sato (J. Chem. Ind. Japan, 1921, 321) that caustic soda and ammonia differ as condensing agents in that the use of the fixed base results in a stronger product.

When an attempt is made to apply these teachings to the large scale manufacture of phenolic condensation products for use in hot molding compositions, numerous difficulties are encountered and certain defects in the products are found.

A phenolic condensation product for use in hot molding compositions must have certain other properties in addition to that of being heat induratable to form a strong molded object. The resinous product must be of such a nature that when subjected to heat and pressure there will be imparted to the molding mixture a degree of thermoplasticity sufficient to cause the mixture to flow to all parts of the mold before the hardening reaction has proceeded to the point at which the mixture possesses no thermoplasticity. On the other hand, the fluidity of the resin at an elevated temperature must not be such as to cause it to separate from the filler and be extruded from the mold.

In order to better understand the present invention, several known and possible methods of producing hot molding phenol formaldehyde compositions will hereinafter be given with an explanation of the behavior of each and the characterizing properties of the products obtained. The first method described will involve the utilization of the primary reaction products obtained by reacting phenol and formaldehyde in the presence of a fixed base.

When phenol and formaldehyde are caused to react in the presence of a fixed base, such as caustic soda, the first products of the reaction are apparently phenol alcohols, which are water-soluble, crystalline bodies.

A solution of phenol alcohols so prepared may be used to impregnate filling materials, such as wood flour, to form a molding composition. It is desirable to add a small amount of reactive methylene substance at this time. The mixing of the phenol alcohol solution with the filler may take place in a kneading machine. The composition as obtained may be dried at a low temperature and then molded under heat and pressure. The composition sets rapidly in the mold to form articles possessing exceptionally high mechanical strength and heat resistivity.

However, due to production of water by the condensation of the phenol alcohols during the molding operation, the articles formed exhibit a tendency to blister upon removal from the mold unless the mold is chilled previous to the removal operation. Furthermore, there is a considerable shrinkage so that it is difficult to hold dimensions with a great degree of accuracy.

Possibly due to the elimination of water from the surface of the molded articles when removed from the mold while hot and possibly due to the excessive shrinkage above mentioned, the articles do not possess a lustrous smooth surface.

Another objection to this process is the fact that the molding composition so prepared has a very low apparent specific gravity which requires, with the utilization of this composition, molds having a relatively deep cavity in order that the relatively large amount of material required to make the compressed articles may be contained therein.

It is usual in the art to briquette or roughly preform molding powders before the hot pressing operation. The depth of cavity may thereby be reduced, but, with the powder above described, difficulty is encountered in making the preforms or pills. On account of its low apparent specific gravity the material does not feed well into automatic preforming machines, and the same difficulty as to depth of cavity is met with.

If an attempt is made to work the powder into a more dense form by means of heated mixing rolls, it is found that the material is too thermoplastic to permit commercial work. The material does not stick to either roll, and it is practically impossible to form sheets which may be ground to form a relatively dense powder.

We will now describe a method of preparing hot molding compositions involving the utilization of the secondary reaction products obtained by reacting phenol and formaldehyde in the presence of a fixed base.

If, instead of using the solution of phenol alcohols formed as the result of the initial reaction between phenol and formaldehyde in the presence of a fixed base, the reaction is carried by appropriate heat treatment to the point where separation of water occurs and a resin containing uncombined methylene groups is formed, other difficulties are encountered.

It is practically impossible in large scale operations to free this product from water in order to obtain a product suitable for incorporation with fillers on heated mixing rolls. As is well known in the art, attempts at dehydration result almost invariably in a worthless, rubbery product.

The product containing some water may be mixed with fillers in a kneading machine with the aid of volatile solvents such as alcohol. The composition may be dried, preferably at a low temperature, and may then be used for hot molding. However, this product has also a very low apparent specific gravity and is subject to the disadvantages aforementioned. But the composition may be worked on mixing rolls successfully to form sheets which may then be ground to form a composition possessing the requisite apparent specific gravity for commercial molding operations.

On molding this composition very strong, resistant articles may be obtained. They are superior in appearance to those obtained from the previously described composition. However, great care is necessary in order to obtain the above results. The composition hardens so rapidly that it is necessary, after filling the mold cavity with molding powder, to close the mold extremely rapidly. Otherwise the composition hardens to such an extent that the particles do not coalesce under the application of pressure. The result in that case is a molded object with mealy edges and/or an incompletely formed object.

Furthermore, the thermoplasticity of the composition is so low that only objects requiring a minimum of thermoplastic flow for their formation may be successfully molded.

Reactions employing basic salts such as sodium acetate, sodium sulphite, etc., constitute still further methods for preparing hot molding compositions, and these basic salts are somewhat similar to fixed bases in their catalytic effect. If the reaction be stopped at an early stage and the product mixed with fillers, a composition similar to the phenol alcohol composition above described is obtained. If the reaction is allowed to proceed to a relatively advanced stage before the molding operation, the same difficulties are met with as in the second case above described. In neither case are objects obtained which possess the same high strength and resistivity as when fixed bases such as caustic soda are used.

Treating now a still further method it is found, when ammonia is used as the condensing agent, a product differing in many respects is obtained. For example, if 2 gram mols of phenol be reacted with $2\frac{1}{3}$ gram mols of formaldehyde after the addition of $\frac{2}{5}$ gram mols of ammonium hydroxide, a very viscous, amber colored product is obtained. This product may be mixed with fillers on mixing rolls with or without a preliminary mixing operation in a kneading machine with the aid of solvents.

The composition so formed has the requisite apparent specific gravity for efficient molding operations. Although it hardens fairly rapidly, it does not harden so rapidly as to cause the production of incompletely formed objects or the production of objects having mealy edges. The thermoplastic flow is such, however, that only objects requiring little flow may be molded.

If, in the above example wherein ammonia is used as the catalytic agent, the proportion of formaldehyde be reduced to $2^{1}/_{7}$ gram mols, a resinous product is obtained which, when mixed with fillers, affords a composition having sufficient amount of thermoplastic flow to meet practically any commercial need.

In both cases, however, the compositions exhibit a tendency to stick to the mold in spite of the introduction of known lubricants. The mechanical strength is sufficient to fill practically all commercial requirements, but is not so great as that obtained by the use of fixed bases.

In another respect the compositions show a serious defect. Molded objects produced from them are very lacking in heat resistance. That is to say, their strength is greatly affected by a rise in temperature. For example, standard test bars made from compositions containing condensation products resulting from the catalytic action of fixed bases show a distortion of 10/1000 of an inch under standard conditions at about 150° C. But when ammonia is used as the condensing agent, the standard test pieces show the same distortion at a temperature of about 110° C.

We will now consider those methods involving the use of homologs of phenol instead of pure phenol. When, instead of pure phenol, homologs of phenol such as mixtures of meta and para cresol and xylenols are used, the difference in the catalytic effects of fixed bases and ammonia are even more marked.

When fixed bases are used with the higher boiling homologs, objects possessing a relatively high strength may be obtained, but the same difficulties due to premature curing are obtained as when pure phenol is used. When ammonia is used as the catalytic agent, the strength of the molded objects is such as to fit them only for those applications wherein mechanical strength and heat resistivity are unimportant. Furthermore, the rate of induration is so slow as to make relatively long heat treatment under pressure necessary.

When mixtures of phenol and the higher boiling homologs are used, the results obtained are intermediate between those obtained when phenol and a mixture of higher boiling homologs, respectively, are used.

With the above understanding of the difficulties which now exist in prior known methods, we will now turn to a consideration of the present invention. We have now found that all of the difficulties and defects attendant upon the use of either fixed bases or ammonia as condensing or catalytic agents may be obviated by the use of both classes of compounds together. That is to say, we have found, as the result of considerable experimentation, that if both a fixed base and ammonia be present during the interaction of the phenolic body and the formaldehyde, that potentially reactive products possessing desirable properties not heretofore realizable are obtained. These properties are such as to render the products obtained by admixture of the resins with fillers peculiarly well suited for commercial hot molding operations. Furthermore, we have found it possible, by utilizing this process, to avail ourselves of the cheaper homologs of phenol.

Products made according to the process of the present invention are preferably mixed with filling materials in kneading machines and then subjected to a further mixing action on heated mixing rolls. After pulverizing to the desired degree of fineness they may be hot molded with excellent results.

The molded products made by this method have about the same degree of strength as those obtained by the use of pure phenol, formaldehyde and ammonia. Unlike the ammonia products, however, our new products have no tendency to stick to the mold. The heat resistance, although not so great as that of products made by the use of fixed bases, is considerably in excess of that obtained by the use of ammonia alone. For example, the above described distortion of standard test bars made from our new products occurs at about 135° C.

The products flow well in the mold and have a sufficient degree of thermo-plasticity to meet any commercial requirement.

The rate of hardening is rapid but not so rapid that any difficulties are encountered due to premature curing, with ordinary commercial precautions, and with the amount of skill in handling molds and molding equipment, well within the ability of ordinary workmen.

The appearance of molded objects made from these compositions is very good, and is of a satisfactory commercial grade even when the objects are removed from the mold without preliminary chilling of the mold. The shrinkage of the materials is comparatively small. The electrical properties of the molded objects are excellent. The ratio of fixed base to ammonia may be varied over fairly wide limits but, in general, we prefer to use very small amounts of fixed base as compared to ammonia. More specifically, we prefer to use not more than five per cent nor less than two-tenths of one per cent, by weight, of fixed base nor more than fifteen per cent, nor less than two per cent, by weight, of ammonia water, reckoned on the phenolic body.

A number of examples will be given in order to illustrate the range of possibilities of this process. The examples are to be considered in a purely illustrative sense, there being a large number of variations possible without departing from the spirit of the invention. In the examples the proportions given are parts by weight.

*Example No. 1*

A mixture comprising 188 parts of phenol, 190 parts of forty per cent formaldehyde, $\frac{1}{10}$ part of calcium hydroxide and 23½ parts of 27 to 29 per cent ammonia water is heated to boiling under a reflux condenser. The reaction so initiated is exo-thermic and in the case of large batches, cooling may be necessary to prevent excessive ebullition.

After about ten minutes, a resinous condensation product begins to separate. The heating is renewed if necessary, as in the case of a small batch, and gentle ebullition is maintained for about fifty minutes or until the mixture no longer smells of formaldehyde.

Supernatant water may be rejected with some loss of phenol, hexamethylenetetramine and water soluble condensation products. The remaining resinous portion contains some water. The resin is preferably mixed with a weight of wood flour approximately equal to that of the anhydrous resin, by means of volatile solvent, such as alcohol, acetone and the like.

Lubricants such as calcium stearate and the like, pigments, dyes and plasticizers may be introduced at this time. Thereafter, the composition is dried, preferably at a low temperature and then subjected to a mixing action on heated mixing rolls. The sheets so formed are ground to produce a molding composition.

The resin produced by this process is a light yellow product of a somewhat softer consistency than a similar product made with ammonia alone. It is not so soft as a fusible, soluble product made from a base alone. In this example the lime may be reduced to $\frac{1}{10}$ part or increased to 1 part without materially affecting the properties of the product.

*Example No. 2*

Same as Example No. 1 except that the formaldehyde is reduced to 173 parts. The composition product therefrom has more thermoplastic flow, is somewhat slower hardening under the action of heat and pressure than is the product of Example 1. The surface resistivity at comparatively high relative humidities, as well as the heat resistance is somewhat less than those of the product of Example 1. The dielectric strength with the same filler is the same. With this product the use of plasticizers is unnecessary for any ordinary purpose.

*Example No. 3*

Same as Example No. 1 except that the ammonia water is reduced to 14 parts. This product is softer than either Examples 1 or 2. It is faster hardening than the previously described products. Molding compositions made therefrom are characterized by very quick softening in the heated mold and a high degree of thermo-plasticity for a short period of time. The heat resistance and the surface resistivity of the molded objects produced therefrom are extremely high.

Example No. 4

A mixture comprising 94 parts of phenol, 100 parts of cresylic acid (containing meta-cresol, para-cresol and xylenols, and boiling between 202° and 220° C.) 190 parts 40 per cent formaldehyde, ½ part of caustic soda and 14 parts of ammonia water are heated to boiling in an apparatus equipped with a return condenser. The initial reaction is vigorous and withdrawal of the heat and cooling in the case of large batches is necessary. A resinous portion begins to separate in about five minutes. After the initial exothermic reaction has subsided heating is resorted to in order to maintain gentle ebullition for about 1⅓ hours or until the odor of formaldehyde has disappeared. The procedure described under Example 1 is followed in making the molding composition.

Compositions made in accordance with this example have a good thermo-plastic flow and objects made therefrom are characterized by very good mechanical and dielectric strength.

Example No. 5

Same as Example No. 4 except that 2 parts of lime are used instead of the caustic soda and only 173 parts of formaldehyde are employed. About 35 minutes of heat treatment suffices to form the potentially reactive product. Molding compositions produced from this condensation product are somewhat faster hardening than similar compositions from the condensation product of Example 4.

Example No. 6

A mixture of 200 parts of the cresylic acid described in Example 4, 179 parts of 40 per cent formaldehyde solution, 1 part of caustic soda, and 9 parts of ammonia water are heated to boiling under a reflux condenser and the heat is withdrawn. Cooling may be employed in the case of a large batch. Separation of a resinous layer occurs in about five minutes. After subsidence of the initial vigorous reaction heating is employed to maintain ebullition for about 1 hour or until the odor of formaldehyde has disappeared. The preparation of the molding composition comprises the steps above described. These compositions are somewhat slower hardening than are those previously described but the products obtained are mechanically strong and are of excellent appearance.

It may be noted that if ammonia alone were used in this example, a product of very inferior properties would be obtained. A product so made is extremely slow hardening and has not the high mechanical strength obtainable by using the two catalysts simultaneously. On the other hand, if caustic soda were employed as the sole catalytic agent, the product would be so fast hardening that it would be practically impossible to obtain a perfect molded article by commercial molding methods.

We are aware that it has previously been proposed to cause the reaction between phenol and formaldehyde to proceed in the presence of caustic potash and ammonia and glycerol and under reduced pressure. (See patent to Mehta No. 1,483,368, February 12, 1924.) Such a procedure does not lead to the production of a potentially reactive product suitable for molding operations. Nor has there been anything taught in the prior art, so far as the applicants are aware, that would lead to the conclusion that desirable results would be obtained by the simultaneous use of both ammonia and a fixed base.

Mehta's process relates to a method for producing a resin suitable for casting and is particularly adapted for the production of articles such as cigarette holders and similar transparent amber colored articles. As distinguished from the present invention, Mehta's product is not adapted for hot molding purposes and in its final form it is stated to be soluble in alcohol, whereas the product of the present invention is permanently insoluble and infusible. Furthermore, caustic potash is used by Mehta in relatively large portions as compared to the ammonia and the ammonia is specified merely for the purpose of giving the amber color which is desired for the products he is making.

A further important distinction is that his product is conducted under a vacuum and as stated in his specification, substantially all of the ammonia is given off during the initial reaction, the vacuum treatment not only removes the ammonia but also removes the formaldehyde whereby his product is incapable of being reacted to a point productive of a hot molding resin of the type here claimed.

It is essential to the present invention that the molding treatment under heat and pressure be conducted in the presence of both a fixed base and ammonia, whereas in Mehta's process substantially no ammonia is present during the casting and final heat treatment.

We are further aware of the British patent to Pollak No. 288,228, accepted February 15, 1929, which relates to the production of a phenol formaldehyde condensation product as an extremely pure powdered precipitate. Although his second formula specifies the use of both caustic soda and ammonia these agents are used only in conjunction with substances referred to as "protective colloids" or, "dispersively acting substances" such as gum arabic, dextrine, gelatin, or similar substances known to have this property.

The present invention differs from Pollak's process in that an oily resinous layer is formed which is converted to a molding powder with a filler with the combined condensing agent still present. Pollak's product is precipitated in the extremely pure form and consequently the resin itself is free from any condensing agent that was utilized in the initial reaction.

It is also well known that the control of colloids is influenced by the hydrogen ion concentration of colloidal suspension and hence the joint use of the condensing agents as specified by Pollak fails to teach anything beyond the specific process described in his patent.

In the above description and in the appended claims, we speak of conducting the reaction in the presence of a fixed base and ammonia, and it is to be understood that the terms formaldehyde and ammonia as employed are to be construed as including their existence in the form of hexamethylenetetramine, as it is well known that immediately upon bringing free formaldehyde and ammonia together, hexamethylenetetramine will be formed.

We also wish it to be understood that the term formaldehyde as used in the specification and claims is to include the polymers of formaldehyde which we consider the equivalents of formaldehyde for the purposes of this invention.

Furthermore, it is to be understood that the term "a phenol" as used in the appended claims, is intended to include pure phenol, cresylic acid or mixtures of these phenols.

Although we have described our invention as it may be practiced by means of what is known in the art as a one-step process, it will readily appear to those skilled in this art that the advantages inherent in this invention may be realized if the invention is practiced by a two-step process. When it is desired to employ a two-step process, it is to be understood that the amount of ammonia introduced at the commencement of the initial reaction should be diminished in amount sufficient to permit the hardening reaction to be effected by employing hexamethylenetetramine, and the invention set forth in the claims is to be so construed.

We have described the use of our new products in molding compositions because their characteristics are such as to render them particularly valuable for such use. However, we do not wish to limit ourselves to such use for many other uses will be apparent to those skilled in the art.

We claim:

1. The process of producing hot molded articles which comprises first producing a potentially reactive oily, resinous layer by reacting a phenol and a substance containing reactive methylene groups in the presence of a condensing agent comprising a fixed base and ammonia, the quantity of fixed base being relatively small compared to the quantity of ammonia present, thereafter adding to said resin a filler, and finally subjecting said resin and filler in the presence of a substantial part of said condensing agent of fixed base and ammonia to the combined action of heat and pressure in a manner to produce articles which are substantially insoluble and infusible.

2. The process of producing a potentially reactive condensation product which is adapted to be molded under heat and pressure by commercial hot molding methods for the formation of products which are substantially insoluble and infusible, which comprises reacting until an oily resinous layer is produced, a phenol and a substance containing reactive methylene groups in the presence of a condensing agent comprising a fixed base and ammonia, the quantity of fixed base being relatively small compared to the quantity of ammonia present, said potentially reactive product containing free uncombined methylene groups and a substantial part of said fixed base and ammonia as a condensing agent for subsequent hot molding under heat and pressure.

3. The process of producing hot molded articles which comprises first producing a potentially reactive oily resinous layer by reacting cresylic acid and a substance containing reactive methylene groups in the presence of a condensing agent comprising a fixed base and ammonia, the quantity of fixed base being relatively small compared to the quantity of ammonia present, thereafter adding to said resin a filler, and finally subjecting said resin and filler in the presence of a substantial part of said condensing agent of fixed base and ammonia to the combined action of heat and pressure in a manner to produce articles which are substantially insoluble and infusible.

4. The process of producing a potentially reactive condensation product which is adapted to be molded under heat and pressure by commercial hot molding methods for the formation of products which are substantially insoluble and infusible, which comprises reacting until an oily resinous layer is produced, cresylic acid and a substance containing reactive methylene groups in the presence of a condensing agent comprising a fixed base and ammonia, the quantity of fixed base being relatively small compared to the quantity of ammonia present, said potentially reactive product containing free uncombined methylene groups and a substantial part of said fixed base and ammonia as a condensing agent, for subsequent hot molding under heat and pressure.

5. The process of producing hot molded articles which comprises first producing a potentially reactive oily resinous layer by reacting cresylic acid and formaldehyde in the presence of a condensing agent comprising a fixed base and ammonia, the quantity of fixed base being relatively small compared to the quantity of ammonia present, thereafter adding to said resin a filler, and finally subjecting said resin and filler in the presence of a substantial part of said condensing agent of fixed base and ammonia to the combined action of heat and pressure in a manner to produce articles which are substantially insoluble and infusible.

6. The process of producing a potentially reactive condensation product which is adapted to be molded under heat and pressure by commercial hot molding methods for the formation of products which are substantially insoluble and infusible, which comprises reacting until an oily resinous layer is produced, cresylic acid and formaldehyde in the presence of a condensing agent comprising a fixed base and ammonia, the quantity of fixed base being relatively small compared to the quantity of ammonia present, said potentially reactive product containing free uncombined methylene groups and a substantial part of said fixed base and ammonia as a condensing agent for subsequent hot molding under heat and pressure.

FRANZ KURATH.
OSCAR A. CHERRY.